United States Patent [19]

Le

[11] Patent Number: 4,556,224

[45] Date of Patent: Dec. 3, 1985

[54] CROSSOVER SEAL ASSEMBLY

[75] Inventor: Tri C. Le, Missouri City, Tex.

[73] Assignee: Joy Manufacturing Company, Pittsburgh, Pa.

[21] Appl. No.: 637,994

[22] Filed: Aug. 6, 1984

[51] Int. Cl.$^4$ .............................................. F16J 15/18
[52] U.S. Cl. ..................................... 277/118; 277/191
[58] Field of Search ............... 277/102, 118, 119, 190, 277/191

[56] References Cited

U.S. PATENT DOCUMENTS

| | | | |
|---|---|---|---|
| 1,263,709 | 4/1918 | Hoke | 277/119 |
| 1,788,966 | 1/1931 | Wilson | 277/118 |
| 4,039,198 | 8/1977 | Stanton | 277/118 |
| 4,240,561 | 12/1980 | Hagstrom et al. | 277/119 |

FOREIGN PATENT DOCUMENTS 3668 of 1885 United Kingdom ............... 277/118

Primary Examiner—Robert I. Smith
Attorney, Agent, or Firm—David A. Warmbold; Marvin J. Marnock

[57] ABSTRACT

A crossover seal assembly (44) for sealing the annulus between a well casing (16) and tubing head (22). The assembly includes spaced pairs of upper and lower metal seal rings (60 and 72, 108 and 120) having matching frusto-conical wedging surfaces (70 and 74, 118 and 122) which interact when an axial compressive force is applied to thereby effect a controlled radial expansion of the seal rings to sealingly engage the inner and outer cylindrical surfaces (48, 47) of the tubing head (22) and well casing (16). The axial compressive force is mechanically applied by a plurality of holddown lock screws (90) which interact through tapered conical tips (94) to energize the crossover seal assembly (44).

11 Claims, 4 Drawing Figures

4,556,224

CROSSOVER SEAL ASSEMBLY

This invention relates generally to a seal assembly for sealing the annulus between the inside wall of a hollow cylindrical member and the outside wall of a second cylindrical member disposed therein and, more particularly, to a crossover seal assembly for sealing the annulus between the inside wall of a casing head or tubing head and the outside wall of a casing extending therein which is suspended in the head below.

A crossover seal is a restricted area packing mechanism designed to be used in the lower flanges of a casing head and/or tubing head to provide a seal between those heads and the portion of casing extending therein which is being suspended in the head below. A crossover seal enables the head in which it is installed to be rated to the next higher API pressure rating above that of the lower flange, provided that the upper flange, and outlets of that head are of the same higher API pressure rating.

Heretofore, a great variety of sealing or packing assemblies have been used for sealing in wellheads. Many of these assemblies employ elastomeric materials in the sealing elements which are susceptible to destruction by fire and at elevated temperatures short of fire conditions tend to deteriorate to such degree that their sealing capabilities are seriously impaired. Such destructible type crossover seals are shown in U.S. Pat. Nos. 2,589,483 and 2,591,142 which utilize rubber seal rings energized by annular compression rings. In a fire situation, the rubber seal ring would melt and thus vacate the annulus to destroy the seal. With high pressure wellheads where fluid pressures in the order of 5,000 p.s.i. and higher are encountered, it is oftentimes necessary to resort to metal seal rings for providing metal-to-metal sealing surfaces.

Accordingly, it is a general object of the invention to provide an improved crossover seal assembly for sealing an annulus as in a wellhead assembly which is effective for sealing under high pressure and high temperature conditions and wherein the seal assembly can be mechanically and pressure activated and maintained.

Another object of the invention is to provide in a wellhead assembly, composed of upper and lower tubular members, a crossover seal assembly for forming a seal between the upper end of a casing supported in the lower tubular member, and the upper tubular member.

It is a further object of the invention to provide in a wellhead assembly including a lower casing head and an upper tubing head mounted thereon an improved type crossover seal assembly for sealing between the outside diameter of the upper end of the casing which is supported within the lower casing head and the inside diameter of the tubing head, said crossover seal assembly being of such construction that the metal-to-metal seal rings therein will be compressed by a plurality of holddown screws to mechanically activate the seal assembly.

SUMMARY OF THE INVENTION

The present invention is directed to a packing assembly for sealing an annulus between cylindrical surfaces of cylindrical members in concentric relationship as between a well casing and tubing head. Specifically, the packing assembly disclosed herein is directed to a wellhead crossover seal assembly for sealing between the outer cylindrical surface of the well casing suspended in a casing head below and the inner cylindrical surface of the tubing head. The inner cylindrical surface of the tubing head is provided with an annular shoulder providing an upper boundary for the annulus with the lower end of the annulus being open to an adapter flange or the casing head. The packing assembly includes spaced pairs of upper and lower metal seal rings having matching frusto-conical wedging surfaces which interact against each other to change axial compression of the seal rings into radial expansion of said rings to sealingly engage the inner and outer cylindrical surfaces of the tubing head and well casing, respectively. The upper set of seal rings are positioned adjacent the annular shoulder of the tubing head. A first energizing ring abuts the bottom of the upper set of seal rings and a second energizing ring is positioned adjacent to the first energing ring and abuts the top of the lower set of seal rings. A locking ring is threaded into the bottom of the annulus to hold the packing assembly in position. The upper and lower sets of seal rings are energized by a plurality of holddown lock screws threadedly received within the flange of the tubing head. The holddown lock screws have inner conical tips which enter the annulus between the first and second energizing rings and engage tapered or frusto-conical facing wedge portions of said energizing rings. Rotation of the lock screws provides inwardly radial movement thereof and corresponding axial expansion of the first and second energizing rings away from each other. The energizing rings apply an axial compression to the upper and lower sets of seal rings which allows the frusto-conical wedging surfaces of the seal rings to interact providing a radial expansion of said rings such that the seal rings sealingly engage the inner and outer cylindrical surfaces of the tubing head and well casing, respectively. The crossover seal assembly is designed to provide a high pressure seal with standard production well casing which has not been prepared in any way to receive the tubing head and/or crossover seal assembly. The outer cylindrical surface of the casing does not have to be machined or otherwise improved to insure a seal with the metal seal rings of the crossover seal assembly.

The matching frusto-conical wedging surfaces of the seal rings have an angle of taper between 8 and 30 degrees relative to the central axis of the tubing head and well casing. An angle of taper below 8 degrees may cause the seal rings to self lock upon axial compression which would prevent their subsequent removal without destruction of the seal rings. An angle of taper greater than 30 degrees requires a very large rotational load or torque to be applied to the holddown screws to obtain the required radial expansion of the seal rings to adequately seal between the tubing head and well casing. The angle of taper shown in the drawings is 12½ degrees which is within the prescribed range and provides the optimal angle at which the respective seal rings interact to provide the necessary radial expansion to obtain a high pressure seal between the tubing head and well casing.

A modification of the invention is also shown wherein only a single set of seal rings are used to seal between the tubing head and well casing. The seal rings are energized by the same holddown lock screws as described above. Furthermore, an injection port is provided in the tubing head allowing communication between the outside atmosphere and the annulus at a position adjacent to the seal rings so that a secondary sealing substance can be injected into the seal assembly if leakage occurs. The injection port can also be utilized as a test port to insure adequate sealing of the seal rings before the wellhead is placed in production.

BRIEF DESCRIPTION OF THE DRAWINGS

In the accompanying drawings which form a part of the specification and are to be read in conjunction therewith.

DETAILED DESCRIPTION OF THE INVENTION

Figure 1:
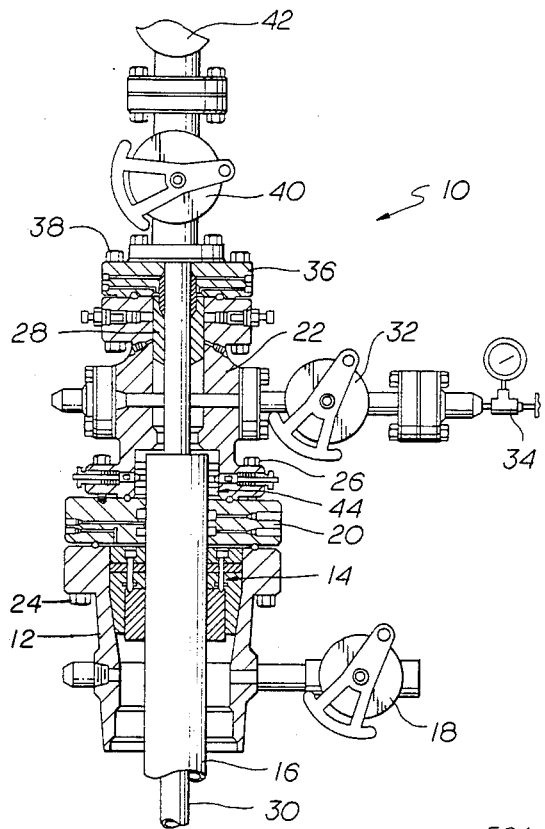
FIG. 1 is an elevational view, partly in section, of a wellhead and christmas tree assembly which incorporates the crossover seal assembly of the present invention.

Referring now to the drawings in more detail and more particularly to FIG. 1, numeral 10 generally designates a wellhead and christmas tree assembly. The wellhead includes a casing head 12 which is adapted to be secured to the top end of a surface casing (not shown). A slip assembly 14 having suitable seals is mounted within casing head 12 and suspends a well casing 16 which extends downwardly into the well concentrically within the surface casings. Casing head 12 has a valve 18 which is connected with an outlet of the casement to control the flow from the annular space between the surface casing 12 and the well casing 16.

An adapter flange 20 is mounted on top of casing head 12 by bolts 24. A tubing head 22 is mounted on top of the adapter flange 20 such that the mating flanges of the adapter flange 20 and tubing head 22 are secured together by bolts 26. A tubing hanger 28 positioned within tubing head 22 supports a string of tubing 30 extending concentrically within well casing 16 to receive fluid produced by the well. A valve 32 is mounted to a side outlet on tubing head 22 to control the flow of fluid from the annular space between tubing 30 and the well casing 16. The outlet controlled by valve 32 is equipped with a pressure gauge 34 to provide an indication of the tubing head pressure. It is possible that pressures as high as 30,000 p.s.i. may exist within the annulus between tubing string 30 and well casing 16.

A second adapter flange 36 is bolted on top of tubing head 22 by bolts 38. A lower master valve 30 is mounted on top of flange 36 to control the flow from tubing 38. An upper master valve 42 is mounted on top of the valve 30 and the remaining portions of a conventional christmas tree including outlet for suitable wing valves may be provided.

In accordance with the present invention, an improved wellhead crossover seal assembly, indicated generally at 44, is provided for sealing between the upper end portion of the well casing 16 extending up into a central bore 46 of the tubing head 22 and the tubing head. The purpose of the crossover seal is to isolate the high pressure fluids existing within the tubing head 22 between the well casing 16 and the central bore 46. In this manner, the portions of the wellhead below tubing head 22 may be rated at lower pressure ratings thereby developing substantial cost savings to the well operator.

Figure 2:
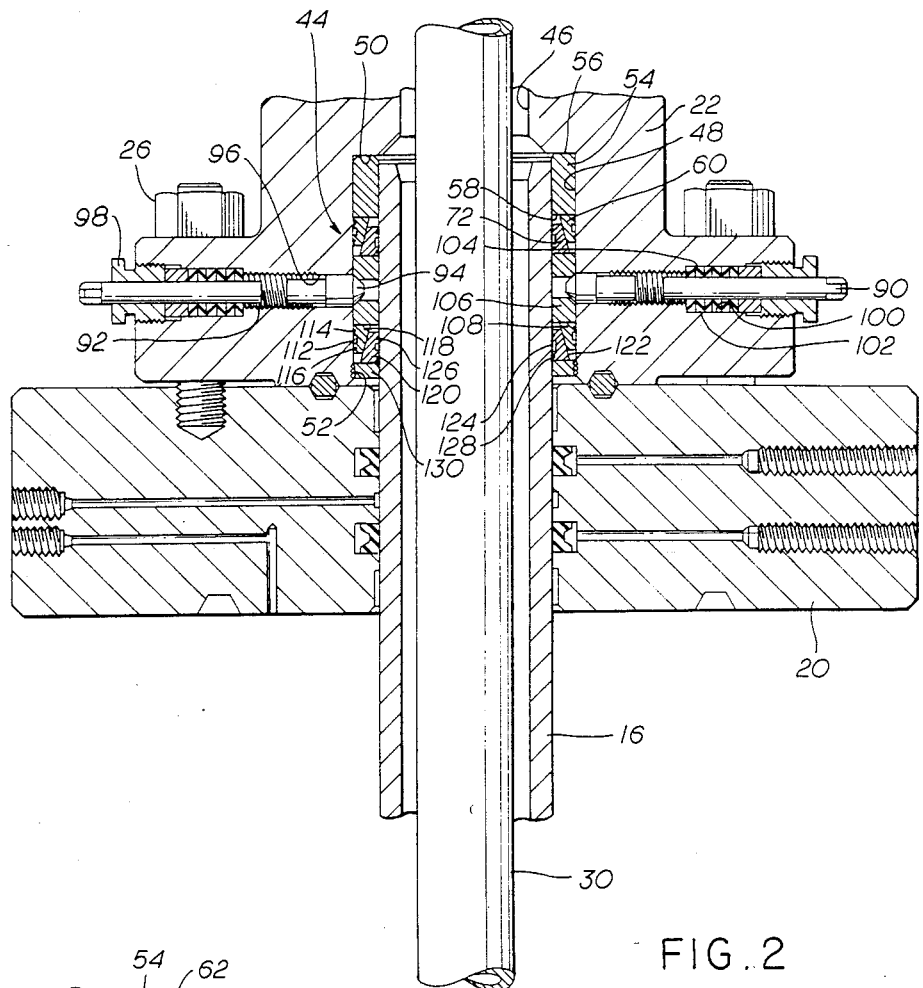
FIG. 2 is an enlarged section of the wellhead showing the crossover seal assembly positioned between a tubing head and well casing with the holddown screws shown in the energized position activating the seal assembly.

Referring particularly to FIG. 2, wherein the present invention is illustrated in enlarged cross section, the improved crossover seal assembly is shown in its energized position between casing 16 and tubing head 22. The central bore 46 of the tubing head 22 has an enlarged diameter inner peripheral surface 48 bounded on its upper end by an annular shoulder 50 defining a chamber for receiving the portion of the well casing 16 extending up into the tubing head 22. A portion of the inner peripheral surface 48 is threaded adjacent its open end as shown at 52. The well casing 16 is standard production pipe casing with an outer cylindrical surface 47 which has not been machined or otherwise prepared to receive the crossover seal assembly 44.

The crossover seal assembly 44 includes an upper spacer ring 54 having flat substantially parallel top and bottom annular surfaces 56 and 58, respectively. The top annular surface 56 of ring 54 is positioned in contiguous relation to the annular shoulder 50 of tubing head 22. A first metal seal ring 60 is positioned adjacent the spacer ring 54. The seal ring 60 has an upper annular end surface 62 positioned in continguous relation to the bottom annular surface 58 of spacer ring 54. The metal seal ring 60 includes an annular groove 64 in its outer peripheral surface to form upper and lower land surfaces 66 and 68, respectively, which abut with the inner peripheral surface 48 of tubing head 22. The metal seal ring 60 has an inner peripheral surface defining a downwardly facing frusto-conical wedging surface 70. A second metal seat ring 72 is provided having an outer peripheral surface defining an upwardly facing frusto-conical wedging surface 74. The angle of taper of the wedging surface 74 of the second metal seat ring 72 is equal to the angle of taper of the wedging surface 70 of the first metal seat ring 60. Seal ring 72 has an annular groove 76 in its inner peripheral surface to form upper and lower land surfaces 78 and 80, respectively, which abut with the outer peripheral surface 47 of well casing 16. The second metal seat ring 72 further includes a bottom annular end surface 82. The second metal seat ring 72 is positioned within the annulus such that its wedging surface 74 contacts the wedging surface 70 of the first metal seat ring 60. An energizer ring 84 is positioned within the annulus in contiguous relation to the bottom end surface 82 of the second seat ring 72. The energizer ring 84 has an upper annular end surface 86 and an outwardly facing frusto-conical bottom end surface 88.

The seal assembly as described above is held in place within the annulus between the well casing 16 and tubing head 22 by a plurality of holddown lock screws 90 each having an externally threaded portion 92 and an inner conical tip 94. The lower flange of tubing head 22 has a plurality of internally threaded openings 96 which receive in threaded relation the holddown lock screws 90. A packing gland 98 is threaded within a large diameter opening 100 surrounding each holddown lock screw 90 and upon rotation compresses a packing set 102 against shoulder 104 to form a seal between holddown lock screws 90 and the adjacent surface defining opening 100.

As shown in FIG. 2, the crossover seal assembly 44 utilizes two sets of metal seal rings. The second or lower set of seal rings include a second energizer ring 106 which is positioned in contiguous relation to the inner conical tip 94 of holddown lock screws 90. A third metal seal ring 108 having a configuration identical to the first metal seal ring 60 is positioned within the annulus abutting the second energizer ring 106. The metal seal ring 108 includes an annular groove 112 in its outer peripheral surface forming upper and lower land surfaces 114 and 116, respectively. The inner peripheral surface of the metal seal ring 108 defines a downwardly facing frusto-conical wedging surface 118. A fourth metal seal ring 120 identical in shape to second seal ring 72 is positioned adjacent the third metal seal ring 108 and includes an outer peripheral surface defining an upwardly facing frusto-conical surface 122 which abuts with the frusto-conical surface 118 of metal seal ring 108. The inner peripheral surface of metal seal ring 120 includes an annular groove 124 forming upper and lower land surfaces 126 and 128, respectively. A locking ring 130 is positioned below the second set of metal seal rings 108 and 120 and is threadedly received within the internally threaded portion 52 of the inner peripheral surface 48 of tubing head 22. The locking ring 130 holds the second set of seal rings 108 and 120 in position until the tubing head 22 can be placed over well casing 16 and energization of holddown screws 90 can be accomplished.

Figure 3:
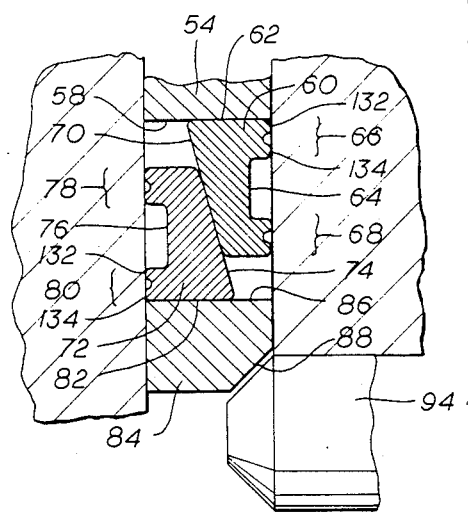
FIG. 3 is an enlarged cross section of the crossover seal assembly as shown in FIG. 2 illustrating the details of the cooperating metal seal rings.

Referring to FIG. 3, which shows a single set of seal rings in detail, the upper and lower land surfaces 66–68, 78–80, 114–116, 126–128 of the respective metal seal rings 60, 72, 108, 120 are provided with a plurality of external surface portions 132 and 134 which are arcuate in radial cross section such that line contact is established between such external arcuate surface portions and the respective inner and outer peripheral surfaces 48 and 47 of the tubing head 22 and well casing 16, respectively. This feature improves the sealability of the metal seal rings because upon axial compression and radial expansion of the metal seal rings the external arcuate portions 132 and 134 of the respective seal rings 60, 72, 108, 120 will develop a greater stress contact with the respective sealing surfaces of the tubing head 22 and well casing 16 to provide a more reliable high pressure, high temperature metal-to-metal seal.

It is necessary to strictly control the angle of taper of the matching frusto-conical wedging surfaces 70, 74, 118, 122 of the respective metal seal rings 60, 72, 108, 120. It has been determined that if the angle of taper of the metal seal rings relative to the central axis of the tubing head 22 and well casing 16 becomes too small the metal seal rings become self locking so that once energized it will be impossible to later separate the tubing head 22 from well casing 16 without destroying the seal rings and possibly other portions of the wellhead. Furthermore, if the angle of taper of the metal seal rings is too great the rotational load or torque of the holddown screws 90 becomes so great that it becomes difficult to obtain the required radial expansion of the metal seal rings to maintain an effective seal between the tubing head and well casing. The optimal range for the angle of taper for the metal seal rings has been determined to be between 8 and 30 degrees relative to the central axis of the tubing head 22 and well casing 16. The angle of taper as shown in FIGS. 1 through 4 is illustrated at $12\frac{1}{2}$ degrees which has been determined to be the optimal angle of taper when the metal seal rings are utilized as a wellhead crossover seal as shown therein. However, it is felt that the metal seal rings shown herein have applications greater than their use as a wellhead crossover seal and it is envisioned that different angles of taper within the range as described could be utilized for sealing any annulus between concentric cylinders.

Furthermore, it is important that the first and third or upper metal seal rings 60 and 108 have the inner peripheral surfaces with downwardly facing frusto-conical wedging surfaces 70 and 118 and the second and fourth or lower seal rings 72 and 120 have the outer peripheral surfaces with upwardly facing frusto-conical wedging surfaces 74 and 122. If the angles were reversed such that rings 60 and 108 had upwardly facing wedging surfaces and rings 72 and 120 had downwardly facing wedging surfaces, it would be nearly impossible to ever remove the tubing head 22 from the casing head 12. In such a situation the respective seal rings would further expand themselves upon lifting of the tubing head 22 from well casing 16 to prevent removal.

In operation the wellhead crossover seal assembly 44 is installed within the tubing head 22 before it is placed over the well casing 16. The first or upper packing set is positioned within the annulus between tubing head 22 and well casing 16. The holddown lock screws 90 are rotated within the flange such that the inner tips 94 contact the first energizing ring 84. The second energizer ring 106 is positioned adjacent the tips 94 of the lock screws 90 and the second or lower packing set is positioned adjacent the second energizing ring 106. Locking ring 130 is threaded within the internally threaded portions 52 of the bore 46 of tubing head 22 to hold the respective parts of the crossover seal assembly 44 in position while placing the tubing head 22 over the well casing 16. After the tubing head 22 is placed over well casing 16 the holddown lock screws 90 are further rotated so as to apply a tremendous radial load upon energizing rings 84 and 106. Upon such radial load the energizer rings 84 and 106 expand axially to energize or compress the metal seal rings 60 and 72, 108 and 120 together. Upon axial compression of the metal seal rings the respective frusto-conical wedging surfaces provide a radial expansion of the two sets of metal seal rings thus allowing the external arcuate portions 132 and 134 of the upper and lower land surfaces of the respective metal seal rings to sealingly engage the inner peripheral surface 48 of tubing head 22 and the outer peripheral surface 47 of well casing 16.

Figure 4:
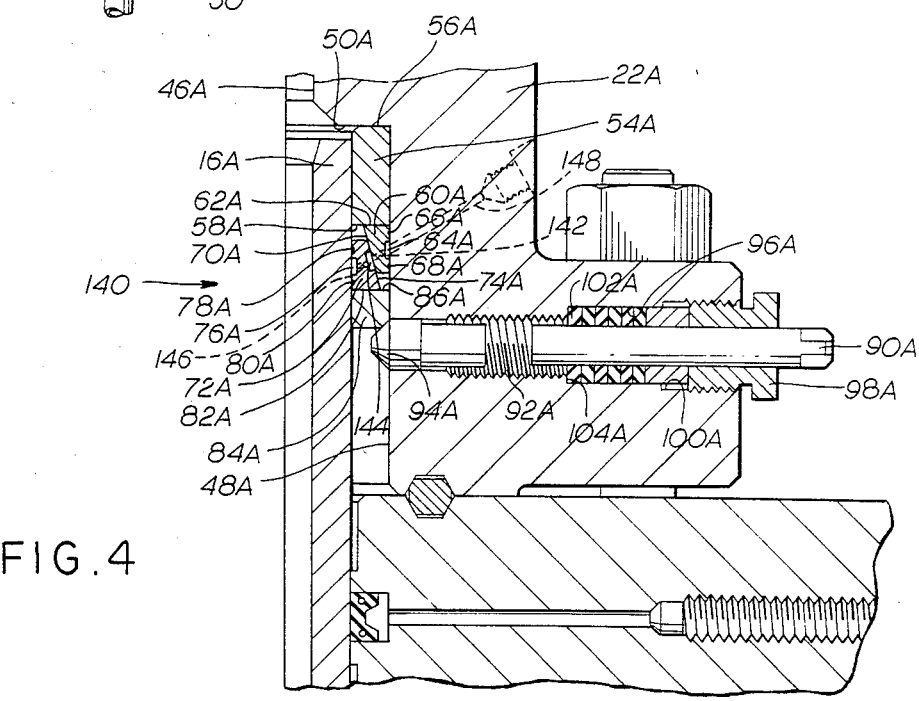
FIG. 4 is an enlarged partial cross section of another embodiment of the invention in which only a single set of metal-to-metal seal rings are shown positioned between the casing and tubing head.

Referring to FIG. 4, a separate embodiment of the invention is illustrated wherein the crossover seal assembly comprises only a single set of metal seal rings to seal between tubing head 22 and well casing 16. Additionally, means is provided for injecting a secondary sealing substance within the seal assembly in case of leakage. In this modification the configuration of the single set of metal seal rings remains the same as in the dual crossover seal assembly 44. The same reference numbers with the addition of an A have been used to denote the duplicated parts within the structure of the single crossover seal assembly 140. The central bore 46A of tubing head 22A has an enlarged diameter inner peripheral surface 48A bounded on its upper end by an annular shoulder 50A defining a chamber for receiving a portion of the well casing 16A extending up into tubing head 22A. An upper spacer ring 54A having flat generally parallel top and bottom annular surfaces 56A and 58A, respectively, is positioned within the annulus formed by tubing head 22A and well casing 16A in contiguous relation to the shoulder 50A. An upper metal seal ring 60A is positioned adjacent the spacer ring 54A. The seal ring 60A has an upper annular end surface 62 positioned in contiguous relation to the bottom annular surface 58A of spacer ring 54A. The metal seal ring 60 includes an annular groove 64A in its outer peripheral surface to form upper and lower land surfaces 66A and 68A, respectively, which abut the inner peripheral surface 48A of tubing head 22A. The metal seal ring 60A has an inner peripheral surface defining a downwardly facing frusto-conical wedging surface 70A. A plurality of circumferentially spaced passages 142 communicate between the annular groove 64A and the wedging surface 70A. A lower metal seal ring 72A is provided having an outer peripheral surface defining an upwardly facing frusto-conical wedging surface 74A. The angle of taper of the wedging surface 74A of the lower metal seal ring 72A is equal to the angle of taper of the wedging surface 70A of the upper metal seal ring 60A. The wedging surface 74A has a peripheral groove 144 cut in its surface approximately midway between the top and bottom portions of ring 60A. The seal ring 72A has an annular groove 76A in its inner peripheral surface to form upper and lower land surfaces 78A and 80A, respectively, which abut with the outer peripheral surface of well casing 16A. A plurality of circumferentially spaced passages 146 communicate between the annular groove 76A and the peripheral groove 144. The lower metal seat ring 72A further includes a bottom annular end surface 82A. The lower metal seat ring 72A is positioned within the annulus such that its wedging surface 74A contacts the wedging surface 70A of the upper metal seat ring 60A. An energizer ring 84A is positioned within the annulus in contiguous relation to the bottom end surface 82A of the second seat ring 72A. The energizer ring 84A has an upper annular end surface 86A and an outwardly facing frusto-conical bottom end surface 88A.

The seal assembly as described above is held in place within the annulus between the well casing 16A and tubing head 22A by a plurality of holddown lock screws 90A each having an externally threaded portion 92A and an inner conical tip 94A. The lower flange of tubing head 22A has a plurality of internally threaded openings 96A which receive in threaded relation the holddown lock screws 90A. A packing bland 98A is threaded within a large diameter opening 100A surrounding each holddown lock screw 90A and upon rotation compresses a packing set 102A against shoulder 104A to form a seal between holddown lock screws 90A and the adjacent surface defining opening 100A. The tubing head 22A further includes a threaded injection and/or test passage 148 which is normally plugged and leads from the outside surface of tubing head 22A to the annular groove area 64A formed on the metal seal ring 60A within the annulus between the tubing head 22A and well casing 16A. In case of leakage, a secondary sealing substance may be injected into passage 148, groove 64A, passages 142, groove 144, passages 146 and groove 76A to seal between tubing head 22A and well casing 16A. Furthermore, a pressurized test fluid may be forced through passage 148 to test seal rings 60A and 72A for leakage before the wellhead is placed into production.

The foregoing description of the invention has been presented for purposes of illustration and explanation and is not intended to be exhaustive or to limit the invention to the precise form disclosed. It was chosen and described in order to best explain the principles of the invention and their practical application to enable others skilled in the art to best utilize the invention in various embodiments and with various modifications as are suited to the particular use contemplated. For example, the packing assembly shown herein can be adapted for sealing within an annulus between any concentric cylindrical members. Furthermore, the axial load creating the axial compression of the metal seal rings can be accomplished by a variety of well known means, such as by use of axially positioned bolts or holddown screws.

What is claimed is:

1. A packing assembly for sealing an annulus between spaced inner and outer cylindrical surfaces arranged in concentric relationship, the outer cylindrical surface having an inwardly extending shoulder defining an annular support surface facing toward the annulus, the packing assembly being positioned within the annulus and comprising:
   an upper first metal seal ring having an upper annular end surface abutting the annular support surface, an annular groove in its outer peripheral surface to form upper and lower annular land surfaces adapted to seal with the outer cylindrical surface, and an inner peripheral surface defining a downwardly facing first frusto-conical wedging surface;
   a lower second metal seal ring having an outer peripheral surface defining an upwardly facing second frusto-conical wedging surface with a matching angle to the downwardly facing first frusto-conical wedging surface of said first seal ring, an annular groove in its inner peripheral surface to form upper and lower land surfaces adapted to seal with the inner cylindrical surface, and a bottom annular end surface;
   means for effecting an axial load on said first and second seal rings to axially compress said rings allowing the first and second wedging surfaces of said respective seal rings to interact providing for radial expansion of said first and second seal rings whereby the respective upper and lower land surfaces of the seal rings are placed in sealing engagement with the inner and outer cylindrical surfaces.

2. A packing assembly as set forth in claim 1 wherein the matching first and second frusto-conical wedging surfaces of said first and second metal seal rings have an angle of taper between 8 and 30 degrees relative to the central axis of said inner and outer cylindrical surfaces.

3. A packing assembly as set forth in claim 1 wherein the matching first and second frusto-conical wedging surfaces of said first and second metal seal rings have an angle of taper equal to 12½ degrees relative to the central axis of said concentric inner and outer cylindrical surfaces.

4. A packing assembly as set forth in claim 1 wherein the upper and lower land surfaces of said first and second metal seal rings comprises an external surface which is arcuate in radial cross section providing line contact with said outer and inner cylindrical surfaces, respectively, to improve the sealability of said first and second metal seal rings.

5. A packing assembly as set forth in claim 1 wherein each of the upper and lower land surfaces of said first and second seal rings comprises a plurality of external surfaces which are arcuate in radial cross section providing a multiplicity of line contact sealing edges with said outer and inner cylindrical surfaces, respectively, to improve the sealability of said first and second seal rings.

6. In a wellhead assembly the combination of:
- a tubing head having an inner peripheral surface including a downwardly facing inner annular support shoulder;
- a well casing extending up into the tubing head and having an outer peripheral surface spaced from and concentric with the inner peripheral surface of said tubing head to define an annular space therebetween;
- a packing assembly positioned within the annular space comprising an upper metal seal ring abutting the annular support shoulder and having an inner peripheral surface defining a downwardly facing frusto-conical wedging surface, and a lower metal seal ring abutting the upper seal ring and having an outer peripheral surface defining an upwardly facing frusto-conical wedging surface with a matching angle of taper to the downwardly facing wedging surface of the upper seal ring;
- means for effecting an axial compression of said packing assembly creating a radial expansion of said inner and outer metal seal rings through interaction between the downwardly facing wedging surface of the upper seal ring and the upwardly facing wedging surface of the lower seal ring to place the upper seal ring in sealing engagement with the inner peripheral surface of said tubing head and the lower seal ring in sealing engagement with the outer peripheral surface of said well casing.

7. A wellhead assembly as set forth in claim 6 in which packing assembly comprises the upper metal seal ring having an annular groove in its outer peripheral surface to form upper and lower land surfaces adapted to sealingly engage the inner peripheral surface of said tubing head, and the lower metal seal ring having an annular groove in its inner peripheral surface to form upper and lower land surfaces adapted to sealingly engage the outer peripheral surface of said well casing.

8. A wellhead assembly as set forth in claim 7 in which the matching frusto-conical wedging surfaces of the upper and lower seal rings having an angle of taper between 8 and 30 degrees relative to the central axis of said tubing head and said well casing.

9. A wellhead assembly as set forth in claim 7 in which each of the upper and lower land surfaces of the upper and lower seal rings comprises an arcuate external surface in radial cross section to provide line contact with said inner and outer peripheral surfaces of said tubing head and well casing, respectively, to improve the sealability of the upper and lower seal rings.

10. A wellhead assembly as set forth in claim 7 in which each of the upper and lower land surfaces of the upper and lower seal rings comprises a plurality of external surfaces which are arcuate in radial cross section to provide a multiplicity of sealing edges for each land surface to improve the sealability of the upper and lower seal rings with the inner peripheral surface of said tubing head and the outer peripheral surface of said well casing, respectively.

11. A wellhead assembly as set forth in claim 7, further comprising:
- means for communicating fluid between the outer peripheral annular groove of the upper seal ring and the inner peripheral annular groove of the lower seal ring; and
- a test passage extending in said tubing head, said passage having one end adapted to receive pressurized test fluid and another end communicating with the outer peripheral annular groove of said upper seal ring to apply the test fluid to the fluid communication means for the purpose of testing said upper and lower seal ring from leakage from the inside of said annular grooves past the respective upper and lower land surfaces.

* * * * *

UNITED STATES PATENT AND TRADEMARK OFFICE
CERTIFICATE OF CORRECTION

PATENT NO. : 4,556,224
DATED : December 3, 1985
INVENTOR(S) : Tri C. Le

It is certified that error appears in the above-identified patent and that said Letters Patent is hereby corrected as shown below:

Column 2, line 17, change "energing" to -- energizing --.

Column 3, line 56, after "valve" and before "is" change "30" to -- 40 --.

Column 3, line 57, after "tubing" change "38" to -- 30 --.

Column 3, line 59, after "valve" change "30" to -- 40 --.

Column 7, line 44, change "bland" to -- gland --.

Signed and Sealed this

Eleventh Day of March 1986

[SEAL]

Attest:

DONALD J. QUIGG

Attesting Officer

Commissioner of Patents and Trademarks